(12) United States Patent
Pfeiffer

(10) Patent No.: US 6,982,981 B1
(45) Date of Patent: Jan. 3, 2006

(54) METHOD FOR CONFIGURING A NETWORK TERMINATION UNIT

(75) Inventor: Johann Pfeiffer, Vienna (AT)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/857,029

(22) PCT Filed: Dec. 1, 1999

(86) PCT No.: PCT/AT99/00293

§ 371 (c)(1),
(2), (4) Date: May 31, 2001

(87) PCT Pub. No.: WO00/33602

PCT Pub. Date: Jun. 8, 2000

(30) Foreign Application Priority Data

Dec. 1, 1999 (AT) .................................... 2028/98

(51) Int. Cl.
*H04J 3/24* (2006.01)
(52) U.S. Cl. ................................ 370/395.43; 370/474
(58) Field of Classification Search ............ 370/310.1, 370/389, 391, 395.1, 395.3, 395.43, 395.6, 370/352, 473, 474
See application file for complete search history.

(56) References Cited

U.S. PATENT DOCUMENTS

| | | | |
|---|---|---|---|
| 5,541,919 A * | 7/1996 | Yong et al. .................. 370/416 |
| 5,581,545 A * | 12/1996 | Moritomo .................... 370/237 |
| 5,771,234 A * | 6/1998 | Wu et al. .................... 370/396 |
| 5,815,499 A * | 9/1998 | Unekawa .................. 370/395.3 |
| 6,192,049 B1 * | 2/2001 | Sohraby ...................... 370/389 |
| 6,212,163 B1 * | 4/2001 | Aida .......................... 370/230 |
| 6,229,789 B1 * | 5/2001 | Simpson et al. ............ 370/235 |
| 6,349,097 B1 * | 2/2002 | Smith ......................... 370/390 |
| 6,404,737 B1 * | 6/2002 | Novick et al. ........... 370/235.1 |
| 6,445,707 B1 * | 9/2002 | Iuoras et al. ........... 370/395.43 |
| 6,597,662 B1 * | 7/2003 | Kumar et al. ................ 370/236 |
| 6,704,315 B1 * | 3/2004 | Besset-Bathias ......... 370/395.4 |
| 6,754,206 B1 * | 6/2004 | Nattkemper et al. ........ 370/369 |

* cited by examiner

Primary Examiner—Chau Nguyen
Assistant Examiner—Joshua Kading

(57) ABSTRACT

The invention relates to a method for configuring a network termination unit for the packet-by-packet asynchronous transfer mode transmission of data. According to said method data subdivided into cells and assembled into packets are transmitted either at a constant data rate (CBR), for example in the case of voice or video data, or at a non-constant data rate (UBR). The data cells or packets are received and transmitted via the network termination unit, which constitutes an interface between a transmission line and data terminal. The number of data cells contained in each transmitted or received data packet is determined in the network unit (10) and from this number it is determined whether the ATM connection is carried out at a constant (CBR) or non-constant (UBR) data rate. The data packets of a CBR connection have processing priority over the data packets of a UBR connection.

6 Claims, 2 Drawing Sheets

METHOD FOR CONFIGURING A NETWORK TERMINATION UNIT

The invention relates to a process for configuring a network termination unit for asynchronous packet ATM (Asynchronous Transfer Mode) transmission of data, the data divided into cells and assembled into packets being transmitted either at a constant data rate (CBR, Constant Bit Rate) or at a non-constant data rate (UBR, Unspecified Bit Rate), and the data cells of packets being received and sent over the network termination unit, which represents an interface between a transmission line and a data end device.

To increase efficiency, the principle of packet switching is applied in many data nets in the transmission of data. The data to be transmitted is divided, at node points defined for the purpose, into defined packets, is provided with an address and additional auxiliary information such as error protection, and is transmitted to the next node in a packet-switched manner independently of the origin and destination of the data; the packets can be intermediately stored in each node until they are transmitted. A service designed for this purpose is, e.g., SDH (Synchronous Digital Hierarchy), in which standardized interfaces and multiplex systems make possible transmission rates of 155 Mbit/s. A further development thereof is represented by the ATM (Asynchronous Transfer Mode) kind of transmission, by means of which the data to be transmitted are split up into cells of fixed length and asynchronously multiplexed. In addition, these cells are combined into standardized packets.

The great advantage of ATM is that the available bandwidth can be used in the best possible manner at any given time. For this purpose, different kinds of transmission rates can be established. Thus, for example, a choice can be made between a constant transmission rate CBR and a non-constant transmission rate UBR, in order to be able to fulfill various requirements. Constant bit rate (CBR) is always required when a delay of the packets by predetermined delay times could have troublesome effects, as is the case for video or speech transmissions. UBR transmission can be generally used in data traffic, since a change of the data transmission rate plays no part for this purpose. Therefore, at nodes within the data transmission path, those data packets which are sent in CBR mode are given preference over those transmitted in UBR mode, in order to be able always to ensure the constant transmission rate for the CBR packets.

In an ATM network which extends via a two-wire circuit, e.g., a subscriber line circuit, to a subscriber's telephone end device, as is realized with broadband transmission applications, for example in connection with ADSL (Asynchronous Digital Subscriber Line), a network termination unit or NT unit over which the data are received and sent exists for each subscriber. In the mentioned ADSL systems, data reception is in the foreground, since the subscriber usually calls up a high information content via the subscriber line circuit, e.g. for home video or internet applications. The subscriber can have various kinds of NT units at his disposal, as for example an ATM interface with 25.6 Mbit/s. Other standards also exist besides this, such as, e.g., Ethernet, but the present invention is not directed toward these.

There are differently equipped ATM NT units which differ from each other by the implemented intelligence. A particular feature consists of the provision of a connection between the NT unit and a so-called element manager in the ATM network on a higher information layer which correspondingly configures the NT units. This configuration data contains, among other things, information concerning the kind of data traffic (Quality of Service, QoS), e.g., CBR or UBR, related to the addresses of the individual cells (VPI/VCI). The respective configuration thereby decides how the received data is to be treated. Thus the CBR packets can be granted priority, since these must not undergo a large or variable delay. They are therefore conducted through small cell buffers, and due to this are limited in their peak transmission rate. UBR packets can appear in large bursts and are therefore to be conducted through large packet buffers, in order to avoid a loss of packets or cells.

Additionally, the so-called EPD (Early Packet Discard) process can be applied to the data stream, and reduces the number of false or lost cells, thereby increasing the data throughput, e.g. for data transmissions (TCIP/IP).

If this remote configuration does not take place, or takes place only to a limited extent, considerable data losses can occur when UBR packets are treated as CBR packets and, because of the small buffer memory, a large part of the data cannot be buffered. A further disadvantage of the conventional configuring process consists in that heretofore no generally accepted protocol has been defined for this purpose, and matching difficulties for this reason arise again and again. Furthermore, remote configuration also increases complexity and thus the costs of an ATM transmission.

The invention therefore has as its object to provide a configuration process of the kind stated at the beginning, with which an effective allocation of ATM packets with different transmission modes and the corresponding buffers can be directly performed in a network termination unit.

This is attained according to the invention in that the number of the data cells contained in each sent or received data packet is determined in the network unit (10), and from this it is determined whether an ATM connection with constant (CBR) or non-constant (UBR) data rate is present; and in that the data packets of a CBR connection are processed with higher priority than the data packets of the UBR connection.

In this manner, each network termination unit can undertake, completely independent of the rest of the network, an analysis of how the incoming or outgoing data traffic is to be treated, so that data losses and the expense of complex protocols can be avoided.

Different adaptation layers (AAL) are defined for the ATM data transmission, according to the application: for CBR connections, usually AAL1 or AAL5, and for UBR connections, AAL5. Network termination units known heretofore cannot automatically determine the kind of transmission present at the time, and therefore have to be remotely configured over the ATM network, resulting in an increased expense.

In a process in which adaptation layers with different packet length are defined for the transmission of the data packets, the network termination unit can, in a development of the invention, determine the kind of data connection, in that on determination of a data packet which contains more than a predeterminable number of cells greater than two, preferably three cells, a UBR packet is detected, and in all other cases a CBR data packet is detected; and in that the ATM connection is correspondingly classified as a UBR or a CBR connection.

A preferential treatment of the CBR transmission can thus be undertaken, in a further development of the invention, in that at the beginning of transmission a CBR connection is always assumed as the initial value.

In order to further ensure that a successive transmission of data packets is carried out in one of the two transmission modes, in a data stream incoming to the network unit or sent out from the said unit, it can be provided according to a further embodiment example of the invention that the presence of a UBR or CBR connection is determined only after the evaluation of the results of a predeterminable number of data packets.

Finally, if a UBR or CBR connection is determined in the network termination unit, according to a variant of the invention it can be provided that the data packets by the network termination unit as data packets of a UBR connection are fed to a buffer with relatively high storage capacity and the data packets detected by the network termination unit as data packets of a CBR connection are fed to a buffer with relatively low storage capacity.

According to a further feature of the invention, it can be provided that on establishing a UBR connection, the network termination unit can optionally be set in the EPD (Early Packet Discard) mode, whereby an overflow of the buffer is prevented.

The invention furthermore relates to a network termination unit for the asynchronous ATM transmission of data in packets (Asynchronous Transfer Mode), by means of which the data divided into cells and assembled into packets with several cells can be sent and received with constant (CBR) and also non-constant (UBR) data rate, a buffer with relatively large capacity allocated to the UBR data, and a buffer with relatively small capacity allocated to the CBR data are provided, which can in particular serve for the application of the process according to the invention.

The invention has as its object to provide a network termination unit which is capable of undertaking an automatic configuration according to the kind of data transmission.

This attained according to the invention in that it comprises a device for the determination of the number of data cells contained in each data packet which undertakes a classification, corresponding to the determined number of data cells, of the ATM connection present, and according to this classification deflects the data packets either into the buffer with relatively small capacity allocated to the CBR data or into the buffer with relatively large capacity allocated to the UBR data.

The mode in which the transmission at the present time is carried out can be determined in this manner for an existing data connection, so that a corresponding effect on the network termination unit can be carried out.

The invention will be described in more detail hereinbelow using the embodiment example shown in the accompanying drawings.

Figure 1:
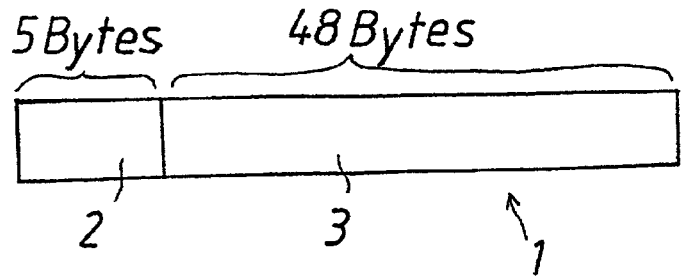
FIG. 1 is a schematic diagram of an ATM cell.

FIG. 1 shows a standardized ATM cell 1, as used for data transmission. In consists of a cell head or header 2 with 5 bytes and a use data field 3 having a length of 48 bytes. Cells of this kind are transmitted asynchronously, and thus without previously fixed allocated places, by multiplexing. The identifier (VPI/VCI) contained in the header is evaluated for the switching of the cells between successive transmission sections, by means of which it can be determined which ATM connection is present at a given time.

Figure 2:
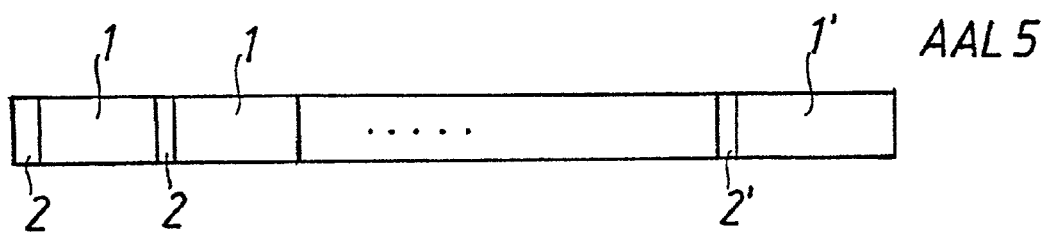
FIG. 2 is a schematic diagram of an AAL5 packet.

During the transmission of data between a data source and a data sink, different adaptation layers (AAL adaptation layers), e.g., AAL1, AAL5, can be allocated to each connection in the ATM process, respectively several cells 1, 1' (up to 1365 cells corresponding to an effective bit rate of 64 kB) are assembled into a packet and are transmitted (FIG. 2). Each header of the last cell of a packet has a special identifier (VCI/VPI) from which an AAL5 packet can be recognized. If such an identifier appears, the adaptation layer is defined as AAL5. However, no unique identification of the kind of transmission (QoS, Quality of Service) can be thereby determined, since CBR connections can also be packaged in AAL5 packets.

Typical applications of CBR (Constant Bit Rate) connections are real time transmissions, accordingly speech and video transmissions, e.g., video conferences, where a delay should take place only within given limits. AAL1 packets are chiefly used for CBR, but nevertheless no clear allocation can result from this criterion, since a CBR transmission is often carried out in which only a single, or very few, ATM cells are sent in an AAL5 packet. The time delay arising from the packing and unpacking of the ATM cells can thereby be kept small. However, more than three ATM cells per packet are not used in a CBR transmission.

In contrast to this, UBR (Unspecified Bit Rate) is chiefly used for pure data transmission and is always carried out using AAL5 packets which contain more than three ATM cells.

Other forms of connection (e.g., VBR, ABR) are also possible besides UBR and CBR; however, these are to be allocated qualitatively to the CBR group, and are therefore not dealt with in further detail here. Two groups are sufficient for the application according to the invention, each connection which has specified a constant transmission rate being counted as belonging to the CBR group.

This leads to the following classification of the two kinds of transmission:

UBR: AAL5 and regularly packet lengths greater than three ATM cells.

CBR: All other connections, e.g., AAL1 or AAL5 with three or fewer ATM cells.

The criterion "three ATM cells" for the determination of the UBR connection can be replaced by an optional other, predeterminable number greater than two.

Figure 4:
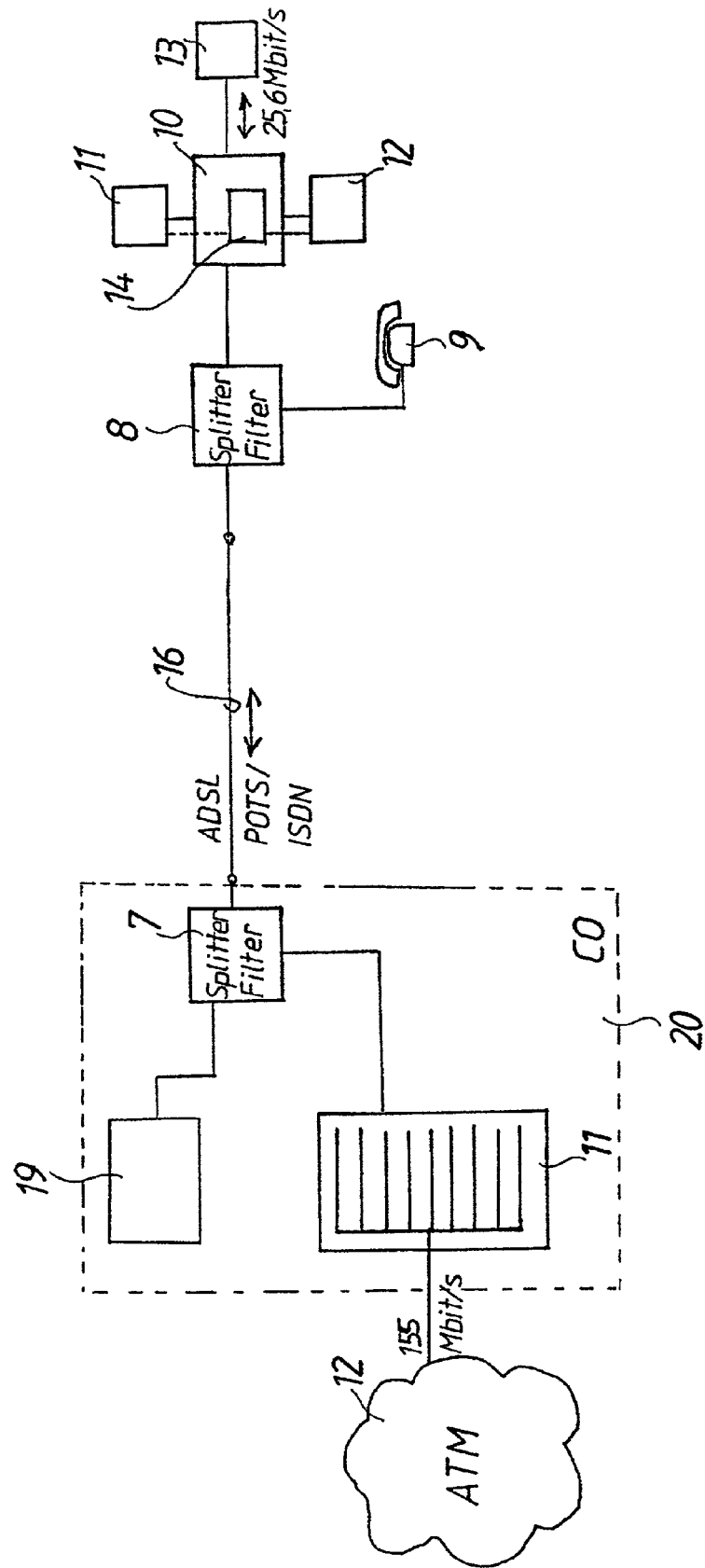
FIG. 4 is a block circuit diagram of an ATM data transmission system with an embodiment of the network termination unit according to the invention.

An example of a data transmission system, for which the process according to the invention can be used, as illustrated in FIG. 4. A subscriber's telephone terminal device 9 and data terminal device 13 are connected via a subscriber circuit 16 to a switching office 20, the analog or digital signals for the telephone terminal device 9 being separated by splitter filters 7, 8 arranged at the ends of a subscriber line circuit 16 from the broadband signals of an ADSL transmission and conducted to, or received by, a subscriber interface (line card) 19. The data received by the data terminal device 13 arrives from an ATM network 12 which is connected to a broadband-ATM/ADSL line card 11 of the switching office 20, via the subscriber line circuit 16 into the network termination unit 10, in which the said data is prepared for the terminal device 13. The packetized, asynchronous transmission of data takes place in the ATM process in which, according to requirements, data can be sent and received at a constant (CBR) and also non-constant (UBR) data rate, and in which a buffer with relatively large capacity 11 allocated to the UBR data, and a buffer with relatively small capacity 12 allocated to the CBR data, are provided. In the reverse direction, transport of the data from the data terminal device 13 to the network termination unit 10 takes place, where the said data is converted into cells and packets and transmitted toward the ATM network 12.

The process according to the invention for configuring the network termination unit 10 for packetized, asynchronous ATM transmission of data now consists in that the number of the data cells contained in each sent or received data packet is determined in the network unit 10, and it is determined therefrom whether an ATM connection with constant (CBR) or non-constant (UBR) data rate is present, and that the data packets of a CBR connection are processed with higher priority than the data packets of the UBR connection.

For this purpose, the network termination unit 10 comprises according to the invention a device 14 which, for the determination of the number of data cells contained in each data packet, conducts a classification of the present ATM connection corresponding to the determined number of data cells, and corresponding to this classification, deflects the data packets either into the buffer with relatively small capacity 12 allocated to the CBR data or into the buffer with relatively large capacity 11 allocated to the UBR data.

Figure 3:
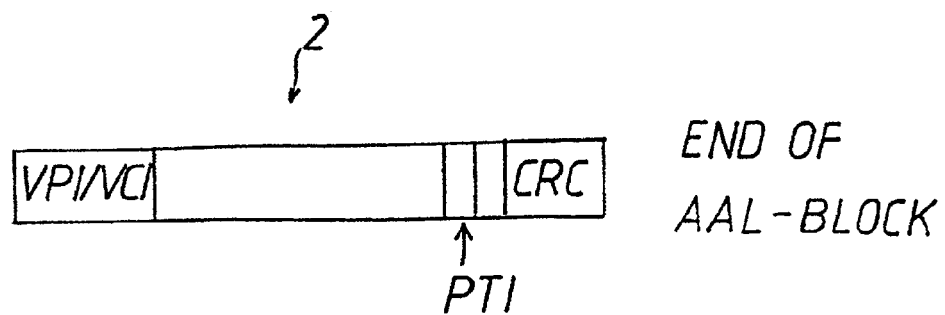
FIG. 3 is a schematic diagram of the cell head of the last cell of an AAL5 packet.

For this purpose, each data packet to arrive or to be sent is tested for this purpose in the device 14; first, the end of a data packet is determined by detection of the packet end cell 1', for which the header 2' is schematically shown in FIG. 3. This header 2' of the packet end cell 1' differs from the header of the other cells 1 by the error recognition code CRC and a data bit denoted by PTI. As soon as the packet end cell 1' has been detected, a statement of the number of cells contained in the whole packet can be arrived at.

When a data packet is ascertained which contains more than a predeterminable number greater than two of cells, preferably three cells, a UBR data packet is detected, and a CBR data packet in all other cases. The ATM connection is classified as a UBR or a CBR connection corresponding to this ascertainment. Thus AAL1 data packets are counted as a CBR transmission without further testing.

It is advantageous if the network termination unit 10 is optionally set in the EPD (Early Packet Discard) mode when a UBR connection is ascertained, so that a memory overflow is prevented. In order to make possible an increase of the correctness of the statement when there are irregularities of the data traffic, a statistical evaluation of several data packets can be performed before a decision is arrived at as to which kind of connection (QoS) is present.

Thus the presence of a UBR or CBR transmission is ascertained only after evaluation of the results of a predeterminable number of data packets. As indicated in FIG. 4, an effect on the buffers 11, 12 can be undertaken after the ascertainment of the kind of transmission of the data packets incoming at the present time by means of the device 14 of the network termination unit 10 according to the invention.

The data packets detected by the network termination unit 10 as UBR data packets are fed to a buffer 11 with relatively high storage capacity, and the data packets detected by the network termination unit 10 as CBR data packets are fed to a buffer 12 with relatively low storage capacity, where they are buffered for further processing. A network-independent and automatic configuration of the network termination unit is thereby possible. All connections in the network termination unit are to be assumed to be CBR connections on switching on or when transmission begins.

What is claimed is:

1. A method for configuring a network termination unit for asynchronous packet ATM (Asynchronous Transfer Mode) transmission of data, said method comprising the steps of:

dividing the data into data cells;

assembling the data cells into packets;

transmitting the packets either at a constant data rate CBR or at a non-constant data rate UBR, wherein the data cells of packets are received and sent over the network termination unit which represents an interface between a transmission line and a data end device;

determining the number of the data cells in each sent or received data packet in the network termination unit, and it is determined therefrom whether an ATM connection with constant CBR or non-constant UBR data rate is present, the data packets of a CBR connection being processed with a higher priority then the data packets of the UBR connection;

determining a class of data connection, wherein adaptation layers with different packet lengths are defined for the transmission of the data packets, wherein, on determination of a data packet which contains more than a predefined number of cells, said predefined number being at least two, a UBR packet is detected, and in all other cases a CBR data packet is detected, and the ATM connection is correspondingly classified as a UBR or a CBR connection.

2. The method according to claim 1, wherein at the beginning of transmission, a CBR connection is always assumed as the initial value.

3. The method according to claim 1, wherein the presence of a UBR or CBR connection is determined only after the determination of the number of data cells in each of a plurality of data packets.

4. The method according to claim 1, wherein, upon establishing a UBR connection, the network termination unit can optionally be set in the Early Packet Discard (EPD) mode.

5. The method according to claim 1, wherein the data packets detected by the network termination unit as data packets of a UBR connection are fed to a first buffer and the data packets detected by the network termination unit as data packets of a CBR connection are fed to a second buffer.

6. A network termination unit for asynchronous packet ATM (Asynchronous Transfer Mode) transmission of data, said network termination unit comprising:

data processing circuitry operative to:

divide the data into data cells;

assemble the data cells into packets;

transmit the packets either at a constant data rate CBR or at a non-constant data rate UBR, wherein the data cells of packets are received and sent over the network termination unit which represents an interface between a transmission line and a data end device;

determine the number of the data cells in each sent or received data packet and determine therefrom whether an ATM connection with constant CBR or non-constant UBR data rate is present, wherein data packets of a CBR connection are processed with a higher priority than the data packets of a UBR connection; and determine a class of data connection, wherein adaptation layers with different packet lengths are defined for the transmission of the data packets, wherein, on determination of a data packet which contains more than a predefined number of cells, said predefined number being at least two, a UBR packet is detected, and in all other cases a CBR data packet is detected, and the ATM connection is correspondingly classified as a UBR or a CBR connection.

* * * * *